United States Patent [19]

Berliner

[11] Patent Number: 5,806,085
[45] Date of Patent: Sep. 8, 1998

[54] METHOD FOR NON-VOLATILE CACHING OF NETWORK AND CD-ROM FILE ACCESSES USING A CACHE DIRECTORY, POINTERS, FILE NAME CONVERSION, A LOCAL HARD DISK, AND SEPARATE SMALL DATABASE

[75] Inventor: Brian Berliner, Colorado Springs, Colo.

[73] Assignee: Sun Microsystems, Inc., Mountain View, Calif.

[21] Appl. No.: 640,527

[22] Filed: May 1, 1996

[51] Int. Cl.$^6$ .................................................. G06F 12/00
[52] U.S. Cl. ........................................ 711/113; 711/118
[58] Field of Search .................................. 395/440, 427, 395/551, 200.01; 711/113, 118

[56] References Cited

U.S. PATENT DOCUMENTS

| 5,163,131 | 11/1992 | Row et al. | 395/200.01 |
|---|---|---|---|
| 5,519,831 | 5/1996 | Holzhammer | 395/182.2 |
| 5,519,853 | 5/1996 | Moran et al. | 395/551 |
| 5,577,224 | 11/1996 | Dewitt et al. | . |
| 5,584,007 | 12/1996 | Ballard | 395/440 |
| 5,588,129 | 12/1996 | Ballard | 395/440 |
| 5,611,066 | 3/1997 | Keele et al. | 395/427 |

FOREIGN PATENT DOCUMENTS

| 0 667 579 A | 8/1995 | European Pat. Off. . |
| 0 713 183 A2 | 5/1996 | European Pat. Off. . |
| WO 95 24685 A | 9/1995 | WIPO . |

OTHER PUBLICATIONS

IBM Technical Disclosure Bulletin, vol. 36, No. 3, 1 Mar. 1993, pp. 541–543, "Local Cache for Server Files".

Offene Systeme. Unix in Deutschland, Guug–Jahrestagung–Open Systems. Unix in Germany. Guug Annual Meeting, 1995, pp. 245–250, Back S.: "Solstice Autoclient—Eine Systeminstallation Als Ersatzteil".

IBM Technical Disclosure Bulletin, vol. 35, No. 1A, 1 Jun. 1992, pp. 217–218, "AFS Initalization Performance Enhancement".

*Primary Examiner*—Tod R. Swann
*Assistant Examiner*—David Langjahr
*Attorney, Agent, or Firm*—William J. Kubida; Stuart T. Langley; Holland & Hart LLP

[57] ABSTRACT

A non-volatile caching system and a method for implement such a system is disclosed. The system is particularly applicable to rotating magnetic media such as hard disk drives. The system retains data even in the event of system shut-down and re-boot. The system is capable of rapidly caching data from large, randomly accessed files, such as databases, in a space-efficient manner. The cached data can be stored in nearly any standard or non-standard format on the magnetic media. A conversion routine converts CD-ROM file names or network file names to local hard disk drive file names and back. A mini-database is created for each cached file on the hard disk drive. The mini-data base maps randomly-accessed blocks of data within the cached file on the local hard disk drive.

20 Claims, 3 Drawing Sheets

METHOD FOR NON-VOLATILE CACHING OF NETWORK AND CD-ROM FILE ACCESSES USING A CACHE DIRECTORY, POINTERS, FILE NAME CONVERSION, A LOCAL HARD DISK, AND SEPARATE SMALL DATABASE

This application is related to U.S. application Ser. No. 08/640,670 filed on Apr. 1, 1996; to U.S. application Ser. No. 08/641,654 filed on May 1, 1996; to U.S. application Ser. No. 08/641,653 filed on May 1, 1996; to U.S. application Ser. No. 08/641,523 filed on May 1, 1996; and to U.S. application Ser. NO. 08/639,531 filed on May 1, 1996, all assigned to Sun Microsystems, Inc., assignee of the present invention, the disclosures of which are herein incorporated by this reference.

BACKGROUND OF THE INVENTION

1. Field of the Invention

This invention relates to non-volatile caching systems for data processing systems, and methods for implementing such systems.

2. Description of Related Art

Caching has long been employed to increase performance of a relatively slow computer memory resource when a faster memory resource, which typically has a higher cost per stored bit, is available. Typically, a temporary memory block within the faster memory resource (i.e., a cache) is established for storing only a portion of the information stored within the slower memory resource. Rather than store within the faster memory resource an entire application program or an entire data file that may be resident on the slower memory resource, certain algorithms are employed to determine which portions of the program or data file are most likely to be accessed. When the system's central processing unit (CPU) calls a memory location that is not stored in the cache, the cache (if completely filled) must be at least partially overwritten with the required data from the slower memory resource. Likewise, when permanent changes are made to data, data in both the cache and the slower memory resource must be updated to reflect that change.

Distributed data processing networks and the LANs within those distributed networks can often benefit from caching. Typically, data links between LANs of a distributed processing network are slower than the interconnections between the nodes (i.e., individual computers) of a LAN. Furthermore, though a distant memory resource (e.g. a disk drive on a distant server system) may be as fast or even faster than local memory resources, long distance interconnections over a data link can dramatically slow access time to that distant resource. Regardless of the type of link between the LANs of a distributed processing network, or between the nodes (i.e., individual systems) of a LAN, each data link has a given bandwidth which will permit only a finite amount of data to be simultaneously transferred over the link. Once the bandwidth is exceeded, as for example when more than a certain number of users are attempting to communicate over the same link (whether between LANs or within a LAN), response time over that link typically degrades as each user's request is delayed in order to evenly accommodate all competing requests. Consequently, caching of data read over a network can generally increase system performance both by reducing data link loading and by providing the end user with a cache of rapidly accessible data.

Within the last several years, compact disc read-only-memory devices (CD-ROMs) have become extremely popular due to the availability of low-cost, high-capacity compact disk storage media and relatively low cost CD-ROM readers (drives). In fact, nearly all new personal computers being sold in the U.S. include an installed CD-ROM drive. Although current CD-ROM media are capable of storing approximately 450–500 megabytes of data, access to that data is considerably slower than data stored on a modern hard disk drive. For example, the current standard for a high-performance CD-ROM drive, known as a "6X" drive is capable of reading, at most, about 600 kilobytes of data per second. A modern high-speed IDE hard disk drive, on the other hand, is capable of reading about six megabytes per second—roughly ten times the speed of a 6X CD-ROM drive. Thus, CD-ROM drive performance may also be greatly enhanced through caching.

Many graphical user interface (GUI) environments, such as Microsoft® Windows™ version 3.X, Microsoft Windows 95, Windows NT®, IBM Corporation's OS/2®, and Geoworks® have been developed over the years. Of the aforementioned products, only Windows NT and OS/2 are true operating systems, as Geoworks and Windows 3.x must be loaded and run under the venerable Microsoft MS-DOS operating system. Windows 95 is somewhat of a hybrid, as it also requires portions of MS-DOS for its operation. For the sake of simplicity, though, both Windows 3.X and Windows 95 are referred to hereinafter as operating systems.

As this is written, Microsoft Windows version 3.X is far and away the most used GUI operating system, having been bundled with nearly every personal computer sold between 1989 and mid-1995. However, from the date of its release in 1995, the Microsoft Windows 95 operating system from Microsoft Corporation has been bundled with most new, high-performance personal computers. In less than a year, it has become the operating system of choice for most business applications, and is expected to rapidly supplant Windows 3.X as the most used operating system for personal computers. The potential exists for significantly increasing the performance of both CD-ROM drives and distributed processing networks operating under Windows 3.X and Windows 95 operating systems through caching.

Shortly after the release of Windows 95, Sun MicroSystems, Inc. (hereinafter "Sun") set about to create a network and CD-ROM caching product that runs under both Windows 3.X and Windows 95, is completely transparent to end-users, and works with a wide variety of file systems running under both Windows 3.X and Widows 95. In order to fulfill these requirements in its recently released caching product, Sun utilizes the services provided by the Installable File System Manager (IFSMGR) virtual device driver. This process, though fully explained in related patent application Ser. No. 08/641,654 will now be summarized.

The PC-CacheFS caching product interfaces with a software module within the Microsoft Windows 95 operating system known as the Installable File System Manager (IFSMGR). The IFSMGR module is classified as a virtual device driver (VxD for short) by Microsoft Corporation. The PC-CacheFS product also fits the definition of a virtual device driver. The Windows 95 operating system is designed so that all file system input/output (I/O) requests are "hooked" to the IFSMGR VxD. In a preferred embodiment of the invention, the PC-CacheFS VxD is layered between the IFSMGR VxD and the generic file system of Windows 95. The PC-CacheFS VxD receives all file system I/O requests from the IFSMGR VxD and takes interim control of the I/O operation while implementing a caching scheme in accordance with set-up instructions which have been pre-programmed by the user of a local node.

Rather than create separate caching products for Windows 3.X and Windows 95, the PC-CacheFS caching product has been designed so that it will run under both operating systems. However, the Windows 3.X operating system has no IFSMGR virtual device driver. Thus, an IFSMGR virtual device driver that will run under Windows 3.X has been written from scratch, following the Windows 95 IFSMGR VxD specification provided by Microsoft Corporation. Thus, neither the PC-CacheFS caching product (VxD) nor the Windows operating systems, themselves, need be rewritten for the sake of compatibility.

SUMMARY OF THE INVENTION

Sun's new PC-CacheFS caching product employs a block of readable, writable and erasable cache memory resident on rotating, magnetic-media (e.g., a hard-disk drive). As a performance enhancement, it may also employ a block of readable, writable and erasable cache memory in the random access memory (RAM).

This invention includes a non-volatile caching system for rotating magnetic media (e.g., hard disk drives) which retains data even in the event of system shut-down and re-boot. The system is capable of rapidly caching data from large, randomly accessed files, such as databases, in a space-efficient manner. The cached data can be stored in nearly any standard or non-standard format on the magnetic media. A conversion routine converts CD-ROM file names or network file names to local hard disk drive file names and back. A mini-database is created for each cached file on the hard disk drive. The mini-data base maps randomly-accessed blocks of data within the cached file on the local hard disk drive.

DETAILED DESCRIPTION OF PREFERRED EMBODIMENTS

The embodiments of the invention described herein may be implemented as logical operations in a distributed processing system having client and server computing systems. The logical operations of the present invention are implemented (1) as a sequence of computer implemented steps running on the computing system and (2) as interconnected machine modules within the computing system. The implementation is a matter of choice that is dependent on the performance requirements of the computing system implementing the invention. Accordingly, the logical operations making up the embodiments of the invention described herein are referred to variously as operations, steps or modules.

Figure 1:
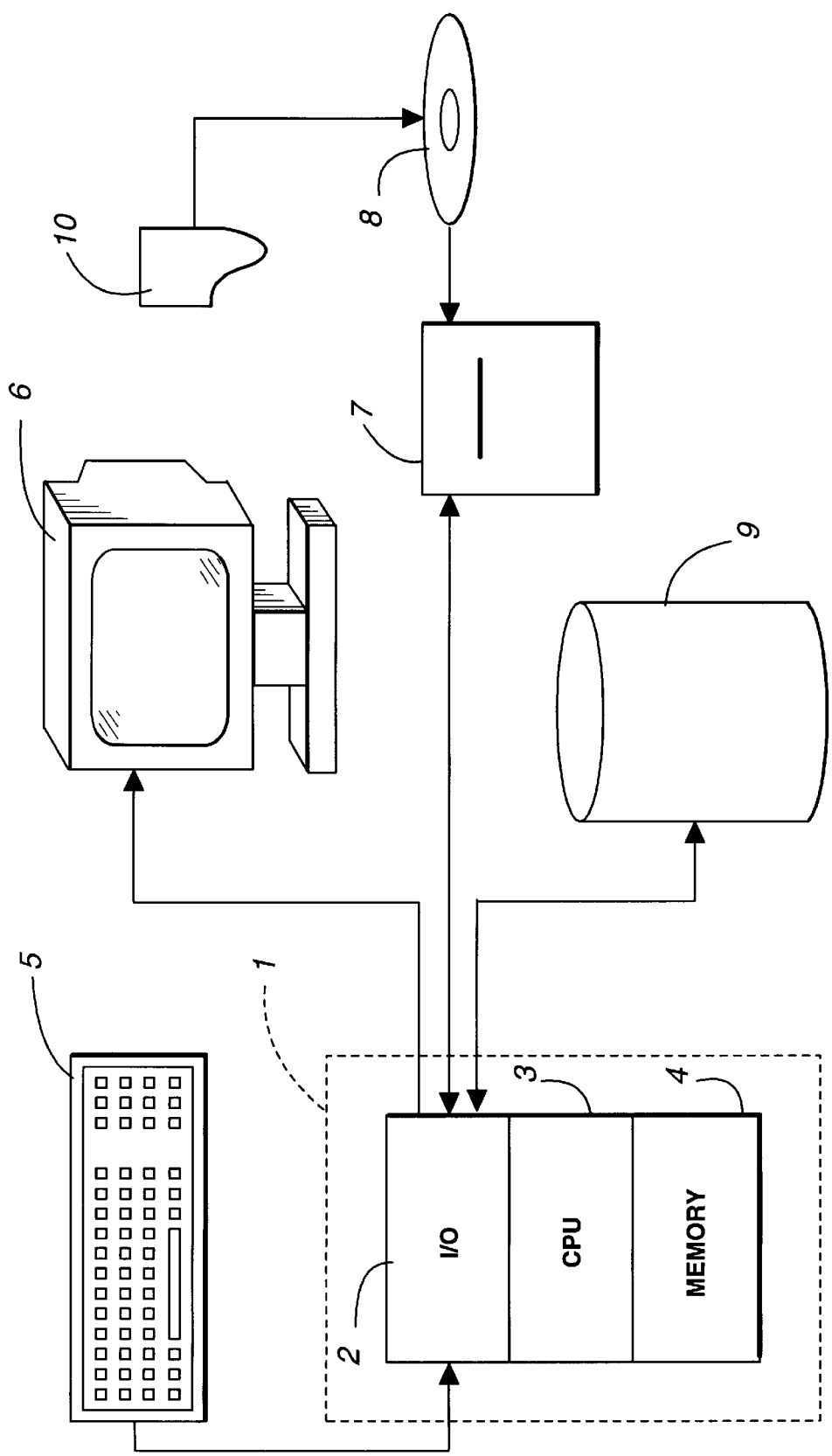
FIG. 1 illustrates a computing system for performing the computer implemented steps of the method in accordance with the invention.

The operating environment in which the present invention is used encompasses the general distributed computing system, wherein general purpose computers, workstations, or personal computers (hereinafter local nodes) are connected via communication links of various types, in a client-server arrangement, wherein programs and data, many in the form of objects, are made available by various members of the system. Some of the elements of a general purpose workstation computer are shown in FIG. 1, wherein a processor 1 is shown, the processor having an input/output (I/O) section 2, a central processing unit (CPU) 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data. The computer program products containing mechanisms to effectuate the apparatus and methods of the present invention may reside in the memory section 4, or on a disk storage unit 9, or on the CD-ROM 8 of such a system. Examples of such systems include SPARC systems offered by Sun MicroSystems, Inc., personal computers offered by IBM Corporation and by other manufacturers of IBM-compatible personal computers, and systems running the UNIX operating system.

The present invention has been incorporated in Sun's PC-CacheFS network and CD-ROM caching product. The invention includes both a non-volatile caching system for rotating magnetic media such as a hard disk drive and a method for implementing the non-volatile caching system. The caching system is designed so that cached data is retained even in the event of system shut-down and re-boot. The system is capable of rapidly caching data from large, randomly accessed files, such as databases, in a space-efficient manner. The cached data can be stored in nearly any standard or non-standard format on the magnetic media. A conversion routine, which will be explained below with reference to FIG. 2, converts CD-ROM file names or network file names to local hard disk drive file names and back. A mini-database is created for each cached file on the hard disk drive. The mini-data base maps any randomly-accessed block of data within the cached file on the local hard disk drive.

Although this disclosure provides a detailed description of the file caching system and method, additional details related to the operation of the on-disk, non-volatile cache memory are provided in three related patent applications: Ser. No. 08/641,654 filed on May 01, 1996 titled "METHOD FOR IMPLEMENTING A NON-VOLATILE CACHING PRODUCT FOR NETWORKS AND CD-ROMS"; Ser. No. 08/641,653 filed on May 01, 1996, titled "MULTI-TIER CACHING SYSTEM AND METHOD FOR IMPLEMENTING SUCH A SYSTEM"; and Ser. No. 08/641,523 filed on May 01, 1996 titled "METHOD FOR PURGING UNUSED DATA FROM A CACHE MEMORY", all of which related patent applications are incorporated herein by reference.

Figure 2A:
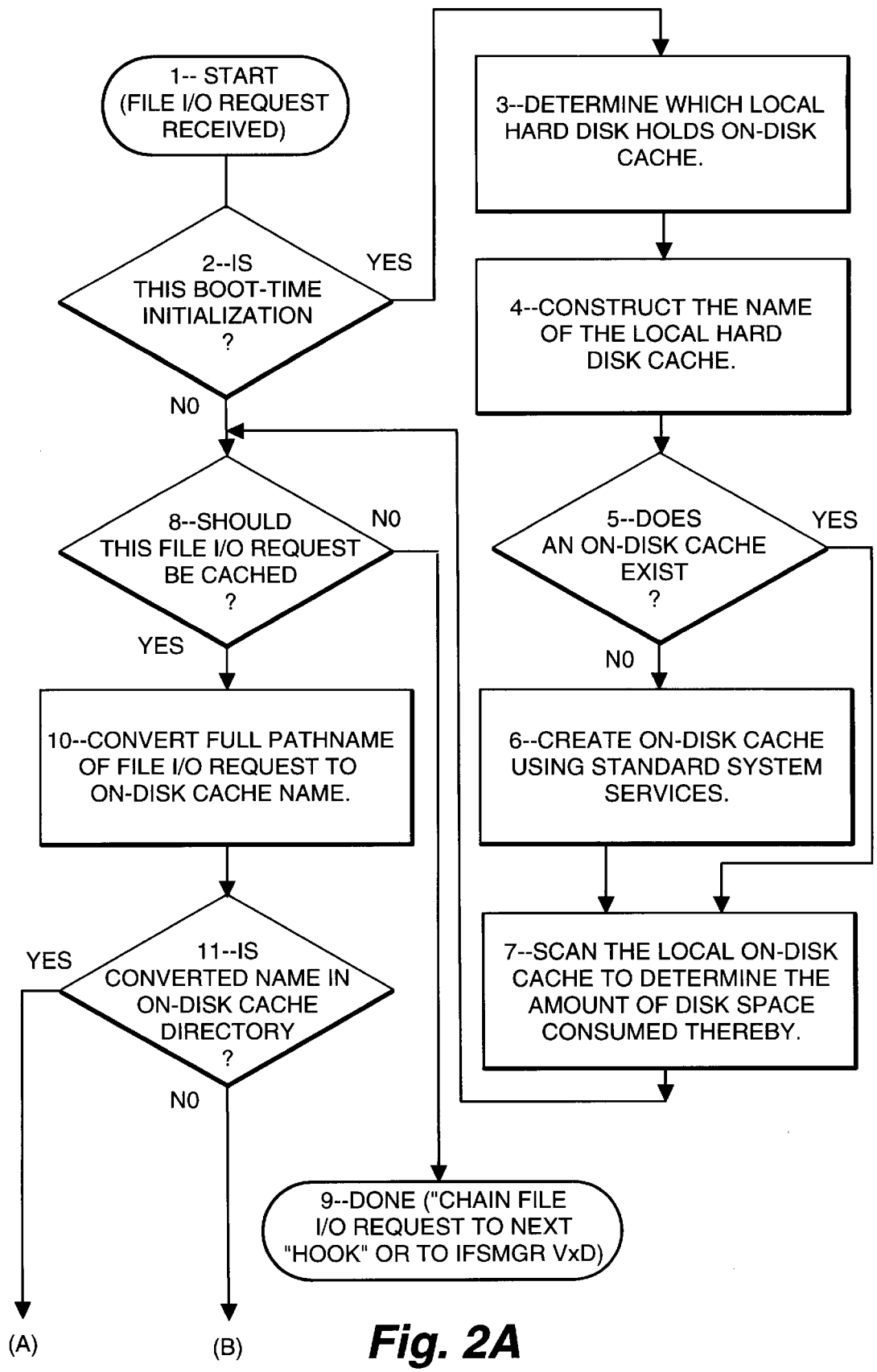
FIG. 2 is a flow chart depicting the logical operational flow for implementing the method for caching network and CD-ROM file accessing a hard disk drive.
Figure 2B:
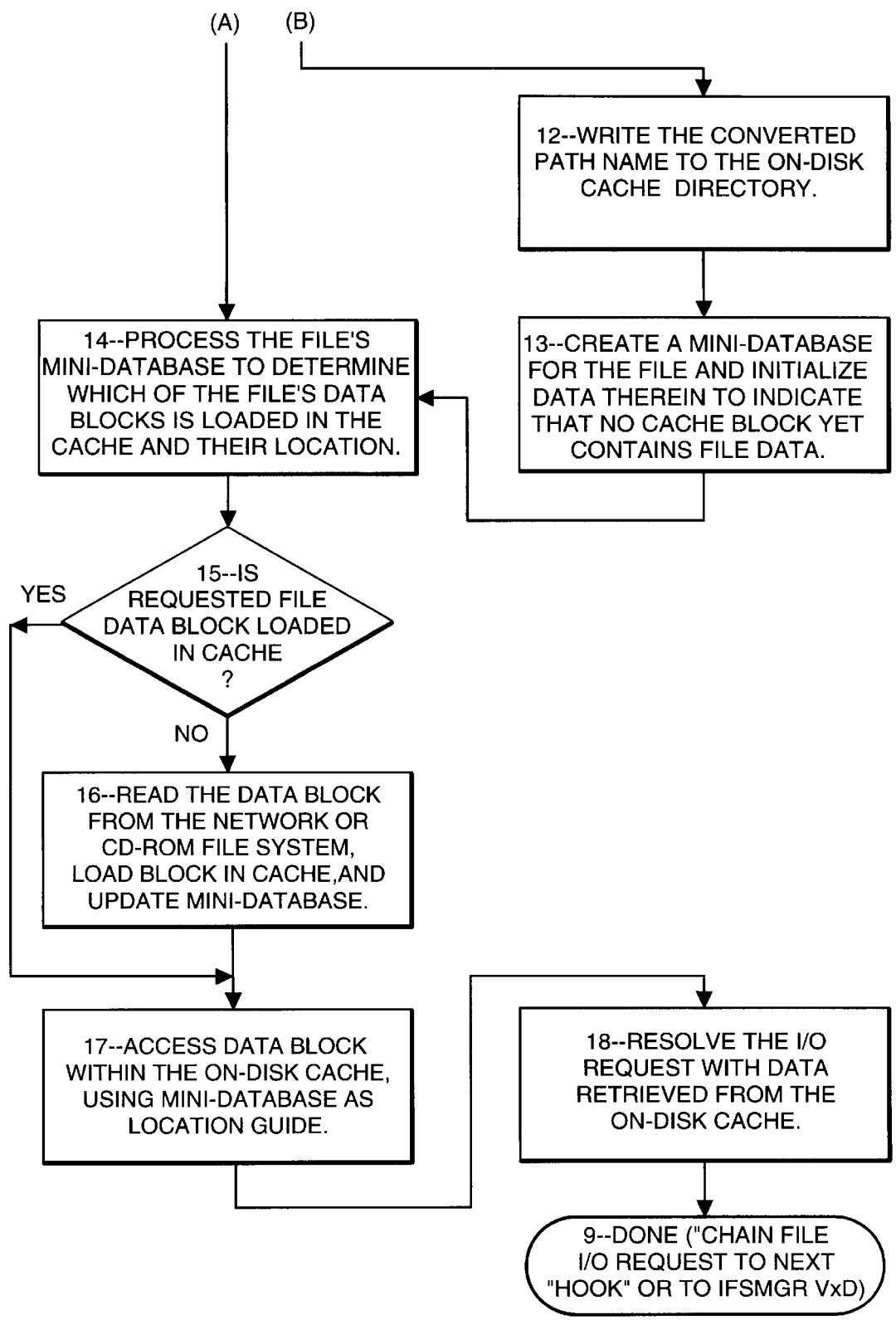

The pseudo-code flow chart of FIG. 2 details the logical steps for the method utilized in implementing and maintaining a preferred embodiment of the Network and CD-ROM file caching system. Referring now to Step 1 of FIG. 2, the method begins upon receipt by the caching VxD of a file I/O request from the IFSMGR VxD either directly or via a chain a hooked chain therefrom. In Step 2, a determination is made as to whether or not this is an instance of boot-time initialization. If it is, then Step 3 determines which local hard disk drive holds the on-disk cache. In Step 4, the name of the on-disk cache is constructed. The on-disk cache name is constructed by combining the drive identifier letter and the name "CFS.SYS". For example, if the set-up program for PC-CacheFS has been configured to place the on-disk cache on the "D" drive, the full name of the on-disk cache will be "D:\CFS.SYS". If this is the first time that the caching VxD is executed by the system, it will not yet have initialized an on-disk cache on drive "D". Therefore, the "D" drive directory is searched in Step 5 for the on-disk cache file name "D:\CFS.SYS". If the on-disk cache file name is not on the "D" drive, it is initialized (i.e., created) using standard operating system services. Once the on-disk cache is in existence, it is scanned in Step 7 to determine the amount of space consumed thereby on the disk drive.

Both the output of Step 7 and the "No" output of Step 2 are fed to Step 8, which determines whether the incoming file I/O request involves data on a mass-storage device that has been designated for caching. If not the file I/O request is chained, in Step 9, to the next VxD "hooked" to the IFSMGR VxD, or to the IFSMGR VxD directly if there are no other VxDs in the chain of hooked VxDs. If, on the other hand, the file I/O request is one which should be cached, the full path name of the file containing the requested data is converted to its on-disk cache name in Step 10. As an example, a CD-ROM file request might be "R:\FULL\PATH\README.TXT". This full path name is converted to "D:\CFS.SYS\R\FULL\PATH\README.TXT". The conversion operation is simple, efficient and readily reversible in order to quickly determine the actual path of the original file at any time.

Step 11 then determines whether or not the converted name exists in the on-disk cache directory. If it does not, the converted path name is written to the on-disk cache directory in Step 12, making any parent directories on the local hard disk drive as required for the new path. Step 13 then initializes a mini-database for the file name. The mini-database will be described in more detail below. Suffice it to say now that the mini-database is initialized to indicate that no blocks within the on-disk cache have yet been loaded with data for that file.

In Step 14, the mini-database for the converted file name is processed to ascertain which data block numbers from the file are loaded within the cache. Step 15 determines whether a block number contained in the mini-database corresponds to the one in which requested data resides on the cached CD-ROM drive. If no such block number is present within the mini-database, data is read from the network or CD-ROM file system over the system data bus and written to a data block within the on-disk cache in Step 16, with the file's mini-database being updated to reflect the presence of file data in a cache block.

In Step 17, data within the cache is accessed using the mini-database as a guide to find the appropriate block. In Step 18, the file I/O request is resolved by loading data retrieved from the on-disk cache onto the system data bus. To complete the process, control is then returned to the IFSMGR VxD in Step 19.

As heretofore stated, each file cached within the nonvolatile cache on the hard disk drive has associated therewith a "mini-database" that is initialized on the hard disk drive within the on-disk cache region. In a preferred embodiment of the invention, the mini-database contains 256 bytes of data. The mini-database hold PC-CacheFS version information so that the structure of the mini-database may be updated in the future if necessary. Also contained in the mini-database is cache consistency information, such as the size of the file on the cached mass-storage device and the time of last file update. The cache consistency information facilitates determining whether data stored within the cache is valid with regard to the data stored within the cached device. Also contained in the mini-database is direct and indirect block information.

In a preferred embodiment of the invention, data is read from the cached mass-storage device and written to the cache in 8-kilobyte blocks. Each 8-kilobyte block in the original file is numbered as an offset from the first or "0" block of the file. For example, an offset of "5" would indicate the sixth block from the beginning of the file. In a preferred embodiment of the invention, the mini-database is able to directly identify (i.e., point to) 91 8-kilobyte blocks within the cache which pertain to the file being cached. The mini-database is also able to point to another 16 indirect blocks. An indirect block is initialized whenever the number of 8-kilobyte blocks for a file being cached exceeds 91. An indirect block is 8-kilobyte data block within the cache that has been converted to a supplemental mapping table. As each block designator requires two bytes, each 8-kilobyte indirect block can point to an additional 4,096 8-kilobyte data blocks which contain data for the file being cached. The mini-database has sufficient capacity to point to a maximum of 16 indirect blocks. Thus, with this data arrangement, the first 745,472 bytes of any cached file can be referenced directly by using the direct block designators within the mini-database. The 16 available indirect blocks provide for caching an additional 65,536 8-kilobyte blocks. Thus, files of up to about 525 megabytes in size may be cached. To get to a block with an offset of 4,000, the program code determines that this offset is not within the direct blocks (of which there are only 91), and computes (by subtracting 91 from 4000) that the pointer for the desired data block will be found within the first indirect block at the 3909th double byte value. The value at this location will point directly to the desired data block within the cache.

As a means of enhancing data block location operations when the required double-byte pointer is found within an indirect block, the on-disk cache code records the last indirect block that is read in the event it is needed for a subsequent access. This technique improves performance when reading data from very large files.

Thus, the heretofore disclosed method for caching network and CD-ROM file accesses using a hard disk drive provides efficient conversion between a cached file path name and a new path name which can be written to the hard disk directory and which identifies the file into which cached data will be loaded on the hard disk drive. In addition, it provides for the initialization of a cache structure on the hard disk drive which includes a mini-database for each cached file, the mini-database storing double-byte pointers, each of which either directly identifies the location of cached block of the original file or points to an indirect block which also stores double-byte pointers, each of which directly identifies the location of a cached block of the original file.

While the invention has been particularly shown and described with reference to a preferred embodiment thereof, it will be understood by those skilled in the art that various other changes in the form and details may be made therein without departing from the spirit and scope of the invention.

What is claimed is:

1. A method for caching, on a hard disk drive controlled by a computer system, file data stored on a mass storage device having an access speed slower than that of the hard disk drive, said method being responsive to file input/output (I/O) requests made by an operating system loaded on the computer system, said method comprising the steps of:

converting a full path name of a file on the mass-storage device which contains data related to a received file I/O request to a file name which corresponds to a file name within a cache directory on the designated drive;

determining whether or not the converted name resides in a cache directory on the disk drive;

if the converted name does not reside in the directory, then creating a cache directory if none exists, writing the converted name to the cache directory, and creating, for a file associated with the converted name, a mini-database which identifies and points to mass-storage device file data within the cache;

processing the mini-database associated with the on-disk cache name file to determine which portions of the mass-storage device file are resident in the cache;

determining whether or not mass-storage device file data associated with the received I/O request is in the cache;

if the data associated with the received file I/O request is not in the cache, then reading the data from the mass-storage device and writing it to the cache and updating the mini-database; and resolving the received file I/O request with data in the cache.

2. The method of claim 1, which further comprises the steps of:

determining, upon receipt of a received file I/O request, whether or not the received request is being made during operating system boot-time initialization;

if the received request is being made during boot-time initialization, then constructing a name which corresponds to a designated name for a cache on the designated drive, and determining whether the constructed name already exists on the designated drive; and if the constructed name already exists on the designated drive, then presuming that a cache having the constructed name exists on the designated drive, and scanning the cache to determine an amount of disk space taken up by the cache; and if the constructed name does not exist on the designated drive, then creating a cache having the constructed name on the designated drive prior to scanning the cache.

3. The method of claim 1, which also comprises the step of initializing data within the mini-database immediately following its creation to indicate that no data for the file associated with the on-disk cache name has yet been written to the cache.

4. A method for caching, on a hard disk drive controlled by a computer system, file data stored on a mass storage device having an access speed slower than that of the hard disk drive, said method being responsive to file input/output (I/O) requests made by an operating system loaded on the computer system, said method comprising the steps of:

providing for converting a full path name of a file on the mass-storage device which contains data related to a received file I/O request to a file name which corresponds to a file name within a cache directory on the designated drive;

providing for determining whether or not the converted name resides in a cache directory on the disk drive;

if the converted name does not reside in the directory, then providing for creating a cache directory if none exists, providing for writing the converted name to the cache directory, and providing for creating, for a file associated with the converted name, a mini-database which identifies and points to mass-storage device file data within the cache;

providing for processing the mini-database associated with the on-disk cache name file to determine which portions of the mass-storage device file are resident in the cache;

providing for determining whether or not mass-storage device file data associated with the received I/O request is in the cache;

if the data associated with the received file I/O request is not in the cache, then providing for reading the data from the mass-storage device and providing for writing it to the cache and updating the mini-database; and providing for resolving the received file I/O request with data in the cache.

5. The method of claim 4, which further comprises the steps of:

providing for determining, upon receipt of a received file I/O request, whether or not the received request is being made during operating system boot-time initialization;

if the received request is being made during boot-time initialization, then providing for constructing a name which corresponds to a designated name for a cache on the designated drive, and providing for determining whether the constructed name already exists on the designated drive; and if the constructed name already exists on the designated drive, then providing for presuming that a cache having the constructed name exists on the designated drive, and providing for scanning the cache to determine an amount of disk space taken up by the cache; and if the constructed name does not exist on the designated drive, then providing for creating a cache having the constructed name on the designated drive prior to scanning the cache.

6. The method of claim 4, which also comprises the step of initializing data within the mini-database immediately following its creation to indicate that no data for the file associated with the on-disk cache name has yet been written to the cache.

7. A method for caching, on a designated local hard disk drive directly controlled by a local computer system which controls at least one local hard disk drive, file data stored on a mass storage device having an access speed slower than that of the designated hard disk drive, said method being responsive to file input/output (I/O) requests made by an operating system, said method comprising the steps of:

determining, upon receipt of a received file I/O request, whether or not the received request is being made during operating system boot-time initialization;

if the received request is being made during boot-time initialization, then determining which of the drives controlled by the local computer system is the designated drive, constructing a name which corresponds to a designated name for a cache on the designated drive, and determining whether the constructed name already exists on the designated drive;

if the constructed name already exists on the designated drive, then presuming that a cache having the constructed name exists on the designated drive, and scanning the cache to determine an amount of disk space taken up by the cache; and, if the constructed name does not exist on the designated drive, then creating a cache having the constructed name on the designated drive prior to scanning the cache;

determining whether or not the received file I/O request should be cached;

if the received file I/O request should not be cached, then terminating the caching method, and if the received file I/O request should be cached, then converting a full path name of a file on the mass-storage device which contains data related to the received file I/O request to an on-disk cache name;

determining whether or not the on-disk cache name resides in a directory on the designated disk drive;

if the on-disk cache name does not reside in the directory, then writing the on-disk cache name to the directory and creating a mini-database for a file associated with the on-disk cache name, said mini-database indicating a presence and a location of portions of the mass-storage device file within the cache, and initializing data within the mini-database to indicate that no data for the file associated with the on-disk cache name has yet been written to the cache, and if the on-disk cache name does reside in the directory, then skipping the steps of writing and initializing;

processing the mini-database associated with the on-disk cache name file to determine which portions of the mass-storage device file are resident in the cache;

determining whether or not mass-storage device file data associated with the received I/O request is in the cache;

if the mass-storage device file data associated with the received request is in the cache, then accessing the associated data using the mini-database as a guide to its location, and if the associated data is not in the cache, then reading the data from the mass-storage device and writing it to the cache and updating the mini-database; and resolving the received file I/O request with data now within the cache.

8. A computer program product comprising a computer usable medium having computer readable code embodied therein for implementing a process for caching, on a hard disk drive controlled by a computer system, file data stored on a mass storage device having an access speed slower than that of the hard disk drive, said process being responsive to file input/output (I/O) requests made by an operating system loaded on the computer, said computer program product further comprising:

computer readable program code devices configured to cause the computer system to effect converting a full path name of a file on the mass-storage device, which contains data related to a received file I/O request, to a file name which corresponds to a file name within a cache directory on the designated drive;

computer readable program code devices configured to cause the computer system to effect determining whether or not the converted name resides in a cache directory on the disk drive;

computer readable program code devices configured to cause a computer, if the on-disk cache name does not reside in the directory, to effect creating a cache directory if none exists, and to effect writing the converted name to the cache directory, and to effect creating, for a file associated with the on-disk cache name, a mini-database which identifies and points to mass-storage device file data within the cache;

computer readable program code devices configured to cause the computer system to effect processing of the mini-database associated with the on-disk cache name file to determine which portions of the mass-storage device file are resident in the cache;

computer readable program code devices configured to cause the computer system to effect determining whether or not mass-storage device file data associated with the received I/O request is in the cache;

computer readable program code devices configured to cause a computer, if the data associated with the received file I/O request is not in the cache, to effect reading the data from the mass-storage device and writing it to the cache, and to effect updating the mini-database; and computer readable program code devices configured to cause the computer system to effect resolving the received file I/O request with data in the cache.

9. The computer program product of claim 8, which further comprises:

computer readable program code devices configured to cause the computer system to effect determining, upon receipt of a file I/O request, whether or not the received request is being made during operating system boot-time initialization;

computer readable program code devices configured to cause the computer system, if the received request is being made during boot-time initialization, to effect constructing a name which corresponds to a designated name for a cache on the designated drive, and to effect determining whether the constructed name already exists on the designated drive; and computer readable program code devices configured to cause the computer system, if the constructed name already exists on the designated drive, to effect presuming that a cache having the constructed name exists on the designated drive, and to effect scanning the cache to determine an amount of disk space taken up by the cache; and computer readable program code devices configured to cause the computer system, if the constructed name does not exist on the designated drive, to effect creating a cache having the constructed name on the designated drive prior to scanning the cache.

10. The computer program product of claim 8, which further comprises computer readable program code devices configured to cause the computer system to effect initializing data within the mini-database immediately following its creation to indicate that no data for the file associated with the on-disk cache name has yet been written to the cache.

11. A caching system implemented in conjunction with a computer system, said caching system comprising:

a local non-volatile mass storage device controlled by the computer system on which data can be alterably stored, said local mass-storage device providing a directory in which is stored cached data and locator data related to the cached data; and a mass storage device having a slower access time than that of said local mass storage device, said slower mass storage device storing files thereon which may be cached on the local mass storage device.

12. The caching system of claim 11, wherein the locator data is stored in a mini-database associated with each file from the slower mass storage device which is cached.

13. The caching system of claim 12, wherein cached data stored in the cache directory is stored within data blocks of equal size, each block of cached data in the cache directory corresponding to an identically-sized block of data within a file stored on the slower mass storage device.

14. The caching system of claim 13, wherein each block of data which makes up a file stored on the slower mass storage device is identified as a block offset from the beginning of the file.

15. The caching system of claim 14, wherein a mini-database associated with a file on the slower mass storage device cached to the local mass storage device contains an ordered sequence of a number n of direct block pointers, each direct block pointer sequentially corresponding to one of a first n number of blocks of data within the file on the slower mass storage device.

16. The caching system of claim 15, wherein said mini-database further contains a number m of indirect block pointers, each indirect block pointer being associated with a database block within the cache directory containing additional direct block pointers, each database block being identical in size to that of a data block.

17. The caching system of claim 12, wherein said mini-database also contains data which identifies a last recorded file size and update time for each file on the slower mass storage device which has been cached on the local mass storage device.

18. The caching system of claim 11, wherein said local mass storage device is a hard disk drive and the slower mass storage device is a local CD-ROM drive.

19. The caching system of claim 11, wherein said local mass storage device is a hard disk drive and the slower mass storage device is a networked hard disk drive coupled to the computer system via a data link.

20. The caching system of claim 12, wherein each mini-database comprises 256 bytes, and each data block is 8-kilobytes in size.

\* \* \* \* \*